US011092416B2

(12) United States Patent
Pattison, II

(10) Patent No.: US 11,092,416 B2
(45) Date of Patent: Aug. 17, 2021

(54) SYSTEM AND METHOD FOR FORMING AN ASSEMBLY

(71) Applicant: Caterpillar Inc., Deerfield, IL (US)

(72) Inventor: James W. Pattison, II, Menominee, MI (US)

(73) Assignee: Caterpillar Inc., Peoria, IL (US)

( * ) Notice: Subject to any disclaimer, the term of this patent is extended or adjusted under 35 U.S.C. 154(b) by 264 days.

(21) Appl. No.: 16/117,616

(22) Filed: Aug. 30, 2018

(65) Prior Publication Data
US 2020/0072590 A1   Mar. 5, 2020

(51) Int. Cl.
| G01B 3/1003 | (2020.01) |
| G01B 3/1061 | (2020.01) |
| G01B 3/1084 | (2020.01) |
| G01D 5/347 | (2006.01) |
| G01B 11/02 | (2006.01) |

(52) U.S. Cl.
CPC ......... *G01B 3/1003* (2020.01); *G01B 3/1061* (2013.01); *G01B 11/024* (2013.01); *G01D 5/34707* (2013.01); *G01B 2003/1087* (2013.01)

(58) Field of Classification Search
CPC .. G01B 3/1003; G01B 3/1061; G01B 11/024; G01B 2003/1087; G01D 5/34707; B25B 11/02
USPC .......................................................... 33/759
See application file for complete search history.

(56) References Cited

U.S. PATENT DOCUMENTS

| 4,242,574 | A | * | 12/1980 | Grant | G01D 5/24404 |
| | | | | | 377/18 |
| 4,988,193 | A | * | 1/1991 | Cain | G01B 11/26 |
| | | | | | 250/233 |
| 5,228,149 | A | * | 7/1993 | Phinn, Jr. | A47K 3/38 |
| | | | | | 33/645 |
| 5,433,014 | A | * | 7/1995 | Falk | G01B 3/1084 |
| | | | | | 33/763 |
| 6,122,042 | A | * | 9/2000 | Wunderman | A61B 1/05 |
| | | | | | 356/343 |
| 7,963,046 | B2 | * | 6/2011 | Fratti | G01B 3/1003 |
| | | | | | 33/759 |
| 8,732,974 | B2 | * | 5/2014 | Jayanetti | G01B 3/1061 |
| | | | | | 33/760 |
| 9,306,623 | B2 | * | 4/2016 | De Coi | B66B 7/064 |
| 9,725,280 | B2 | * | 8/2017 | De Coi | B66B 3/02 |
| 2010/0315653 | A1 | * | 12/2010 | Weingartz | G01P 3/366 |
| | | | | | 356/620 |
| 2010/0325909 | A1 | * | 12/2010 | Fratti | G01B 3/1003 |
| | | | | | 33/707 |
| 2011/0169924 | A1 | * | 7/2011 | Haisty | H04N 9/3147 |
| | | | | | 348/51 |
| 2011/0234788 | A1 | * | 9/2011 | Koike | G01B 11/25 |
| | | | | | 348/95 |

(Continued)

FOREIGN PATENT DOCUMENTS

WO    2017198992    11/2017

*Primary Examiner* — Yaritza Guadalupe-McCall
(74) *Attorney, Agent, or Firm* — Hibshman Claim Construction PLLC

(57) ABSTRACT

A method for forming an assembly of a plurality of components. The method includes receiving, by a controller, one or more assembly identification parameters and controlling, by the controller, a light array disposed along an assembly jig based on the one or more assembly identification parameters.

13 Claims, 12 Drawing Sheets

(56) References Cited

U.S. PATENT DOCUMENTS

| | | | |
|---|---|---|---|
| 2015/0059195 A1* | 3/2015 | De Coi | B66B 7/064 |
| | | | 33/760 |
| 2015/0060213 A1* | 3/2015 | De Coi | G01B 3/1084 |
| | | | 187/394 |
| 2017/0261351 A1* | 9/2017 | Nagura | G01D 5/34707 |
| 2020/0072590 A1* | 3/2020 | Pattison, II | G01B 3/1061 |
| 2020/0134942 A1* | 4/2020 | Root | B60C 23/127 |
| 2020/0166382 A1* | 5/2020 | Larson | G01D 5/34707 |

* cited by examiner

SYSTEM AND METHOD FOR FORMING AN ASSEMBLY

TECHNICAL FIELD

The present disclosure relates to forming an assembly. More particularly, the present disclosure relates to a system and method for providing visual indication along an assembly jig to assemble a plurality of components.

BACKGROUND

Assemblies having a plurality of components are used in a variety of applications, ranging from mechanical machines such as automobiles, construction machinery and fluid system to various industrial plants. Typically, forming such assemblies, for example a hose assembly, require a hose to be placed in a specifically designed wooden assembly-jig or a trough, such that an end of the hose coincides with an end of the wooden jig/trough. An operator measures a predefined distance from the end of the hose/wooden-jig to locate an installation position of an additional component (such as a clamp, a protector, etc.) to be mounted on the hose. The operator repeats the process of measuring predefined distances from the end of the hose to locate plurality of installation positions for plurality of additional components. Such a process consumes a lot of time and is highly laborious.

Additionally, in a variety of applications, it may be desired to have different kind of hose assemblies (in the range of thousands). In such cases, different types of wooden-jigs have to be designed, thereby escalating cost. Furthermore, storing such a large number of wooden-jigs requires a warehouse, having large storage space, leading to additional expenditure. Moreover, inspection of thousands of hose assemblies and wooden-jigs would require inspection gauges and operating time, adding to the overall cost.

WO2017198992 teaches a measuring apparatus. The measuring apparatus comprises a measuring scale having predetermined measurement marks, adapted to receive a piece to be measured. The measuring apparatus further includes a scanner capable of scanning and reading the measurement marks corresponding to a position of a part to be measured. Furthermore, the measuring apparatus includes an output apparatus adapted to output and store a measurement figure.

SUMMARY OF THE INVENTION

In an aspect of the present disclosure, a method for forming an assembly of a plurality of components is disclosed. The method includes receiving, by a controller, one or more assembly identification parameters and controlling, by the controller, a light array disposed along an assembly jig based on the assembly identification parameters.

In another aspect of the present disclosure, an assembling system for forming an assembly of plurality of components is disclosed. The assembling system includes an assembly jig, a light array, and a controller. The light array is disposed along the assembly jig. The controller is communicably coupled to the light array and is configured to receive one or more assembly identification parameters and control the light array disposed along the assembly jig based on the assembly identification parameters.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
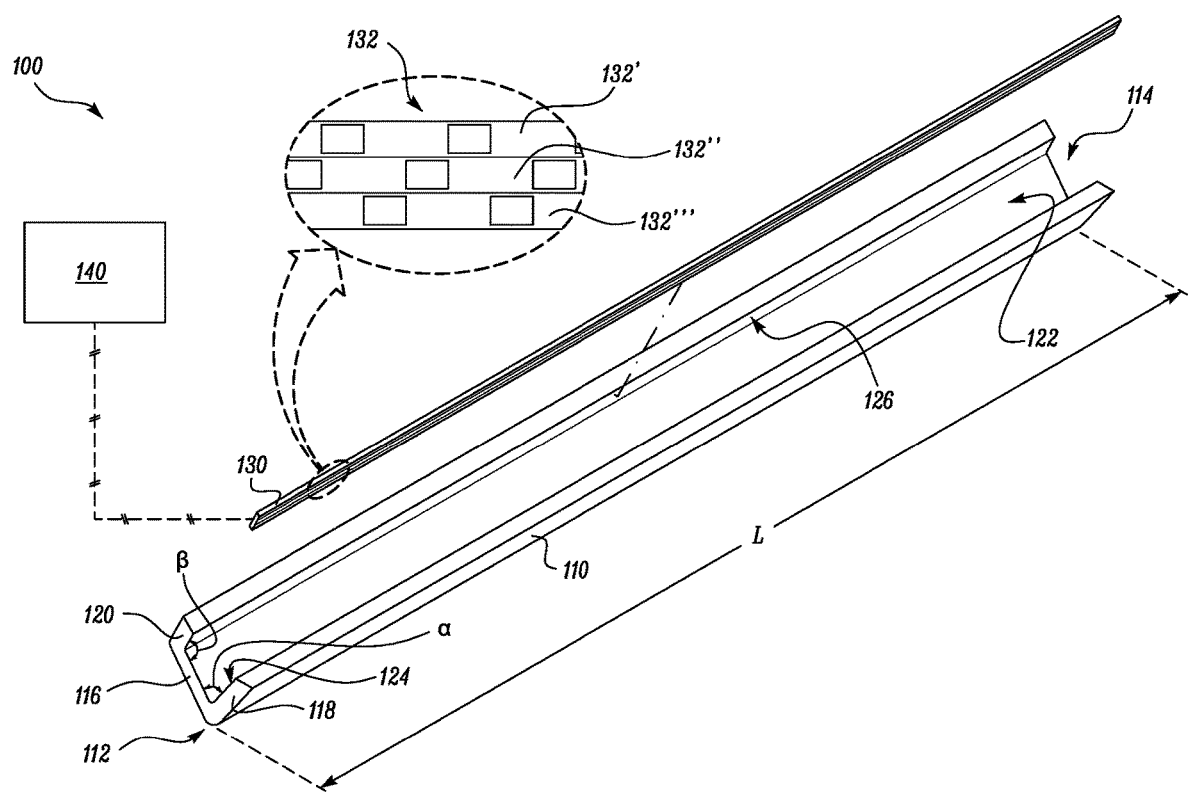
FIG. 1 illustrates an assembling system configured to assemble a plurality of components, in accordance with an embodiment of the present disclosure.

Referring to FIG. 1, the present disclosure discloses an assembling system 100 for forming assemblies of plurality of components. The assembling system 100 includes an assembly jig 110, a light array 130 and a controller 140.

The assembly jig 110 may be a three-dimensional structure configured to receive one or more components, as shown in FIG. 1. In the embodiment illustrated, the assembly jig 110 is a V-shaped elongated structure configured to receive a plurality of components to facilitate formation of assembly(ies). The assembly jig 110 includes a first end 112 and a second end 114 defining a length 'L' therebetween. The assembly jig 110 may further include a first wall 116, a second wall 118 and a third wall 120. The first wall 116 is inclined at an angle 'α' relative to the second wall 118. The first wall 116 defines a first surface 122 and the second wall 118 defines a second surface 124. The third wall 120 is inclined at an angle 'β' relative to the first wall 116. The third wall 120 defines a third surface 126.

Figure 4:
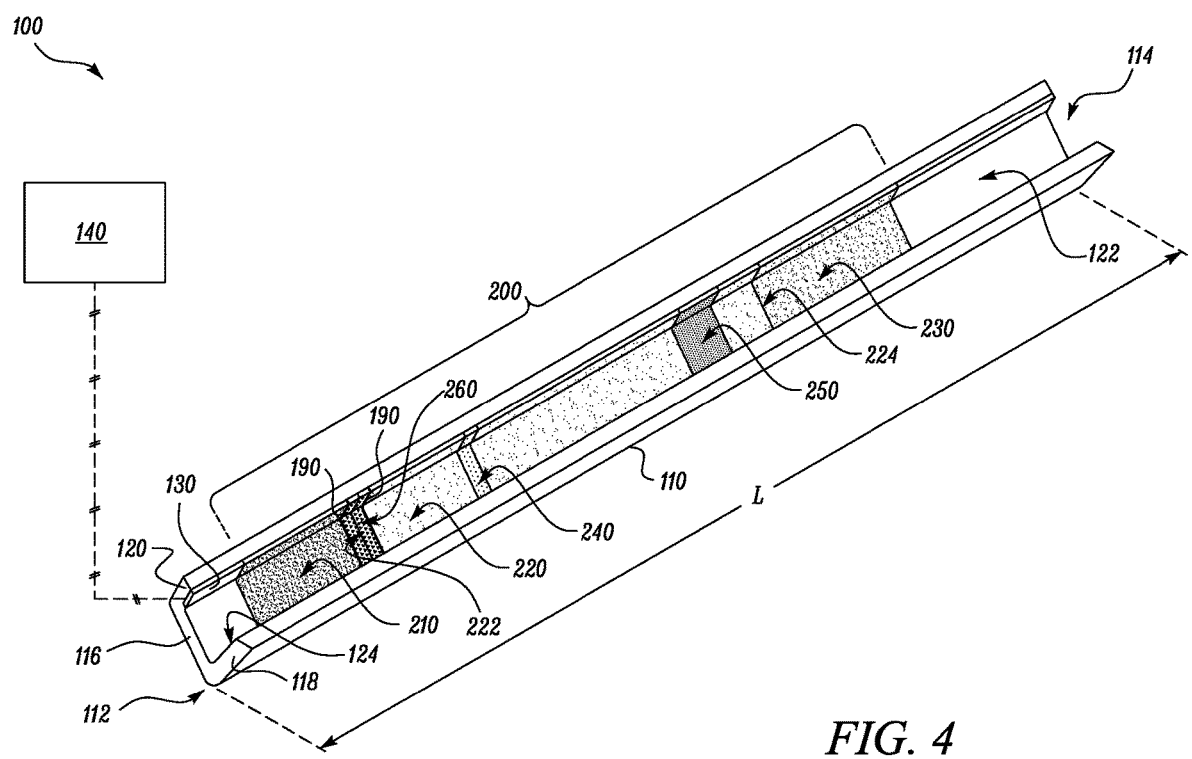
FIG. 4 illustrates one or more exemplary areas, surfaces and/or locations on the assembly jig illuminated by the light array, in accordance with an embodiment of the present disclosure.

The light array 130 is disposed along at least a portion of the length 'L' of the assembly jig 110. In the embodiment illustrated in FIG. 1, FIG. 2 and FIG. 4, the light array 130 is disposed within the assembly jig 110. The light array 130 is disposed over the third surface 126 defined by the third wall 120. The angle 'β' between the first wall 116 and the third wall 120 is such that when the light array 130 provided on the third surface 126 is powered, light patterns along the assembly jig 110 i.e. on the first surface 122 and the second surface 124 are generated, as shown in FIG. 4.

Referring back to FIG. 1 and FIG. 2, the light array 130 extends from the first end 112 of the assembly jig 110 to the second end 114 of the assembly jig 110. In an embodiment, the light array 130 may include one or more LED (Light Emitting Diode) tapes 132 disposed along the length 'L' of the assembly jig 110. In the embodiment illustrated, the light array 130 includes three LED tapes 132', 132", 132'" where each LED tape includes a plurality of LEDs and the tapes 132', 132", 132'" are stacked at an offset to each other.

The controller 140 may be communicably coupled to the light array 130. The controller 140 may include suitable logic, circuitry for executing one or more instructions on received input/parameters to perform a predetermined operation. More specifically, the controller 140 is configured to receive one or more assembly identification parameters. The one or more assembly identification parameters correspond to one or more identifiers for determining a specific assembly to be formed.

The controller 140 is further configured to implement one or more instructions on the received one or more assembly identification parameters and then control the light array 130 based on the one or more assembly identification parameters (i.e. controller 140 generate light patterns in the assembly jig 110 i.e. on the first surface 122 and second surface 124 by the controlling light array 130 based on the one or more assembly identification parameters).

Figure 2:
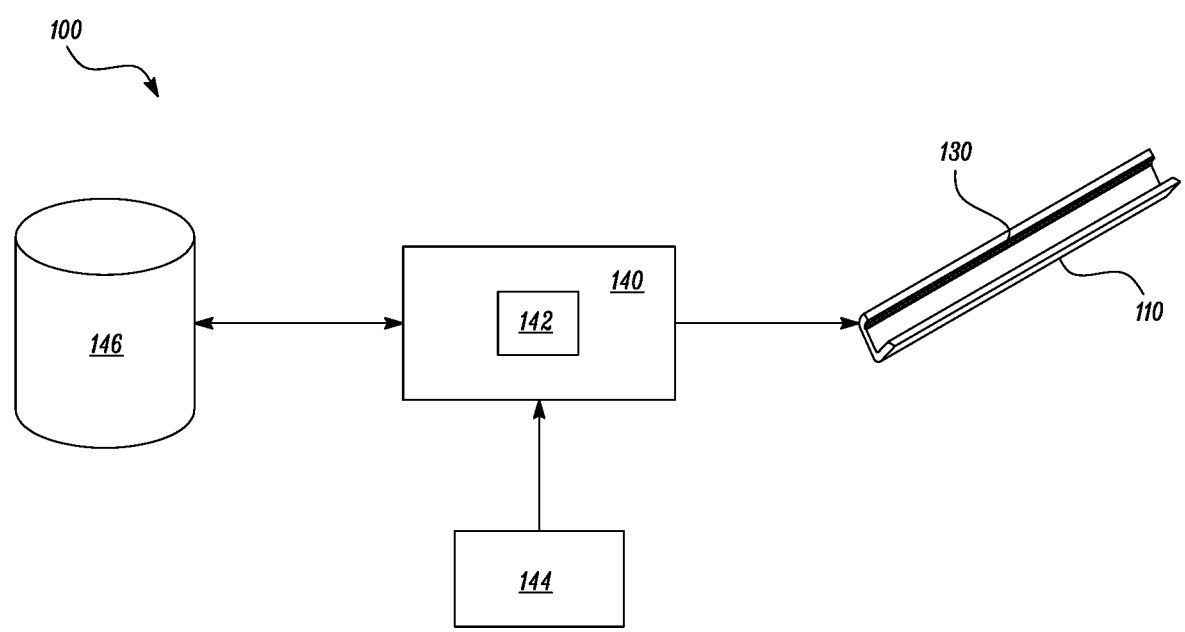
FIG. 2 illustrates the assembling system, in accordance with an alternate embodiment of the present disclosure.

The controller 140 may include one or more of a processor, a microprocessor, a microcontroller, or any other suitable means for executing the one or more instructions. For example, the controller 140 may include an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor or any other processor. The one or more instructions may be retrievably stored within a memory 142. The memory 142 may be provided on-board the controller 140 (as shown in FIG. 2) or external to the controller 140. The memory 142 may include non-transitory computer-readable medium or memory, such as a disc drive, flash drive, optical memory, read-only memory (ROM), or the like.

In an embodiment, the assembling system 100 may further include an input device 144. The input device 144 may be communicably coupled to the controller 140 and may be configured to receive the one or more assembly identification parameters from an operator. The controller 140 may be configured to receive the one or more assembly identification parameters from the input device 144. Based on the one or more assembly identification parameters received from the input device 144, the controller 140 may be configured to determine areas, surfaces and/or locations on/in the assembly jig 110 to be illuminated. More specifically, the controller 140 may be configured to control the light array 130 such that the determined locations, surfaces and/or areas on the assembly jig 110 are illuminated.

The input device 144 may be a display unit configured to receive the input from the operator. In such an implementation, the display unit includes touch sensitive layer (either capacitive or resistive layer) to receive input from the operator. The display unit may be a Light Emitting Diode (LED) display, an Edge LED display, a Thin Film Transistor (TFT) display, a Liquid Crystal Display (LCD) display, and/or the like. In other embodiments, the input device 144 may be one of a keyboard, a keypad, a panel of buttons, and a plurality of switches.

In an embodiment, the assembling system 100 may further include a database 146. The database 146 may be any suitable combination of large scale data storage devices, which may optionally include any type or combination of slave databases, load balancers, dummy servers, firewalls, back-up databases, and/or any other desired database components. In configurations where the assembling system 100 includes the database 146, the controller 140 may first receive the one or more assembly identification parameters from the input device 144. The controller 140 may then extract data from the database 146 based on the one or more assembly identification parameters. For example, based on the one or more assembly identification parameters, the controller 140 may determine a specific assembly to be formed. Subsequently, the controller 140 may extract data associated with the determined assembly from the database 146 (the data associated with assemblies desired to be formed may be pre-stored in the database 146). The explanation as to how the controller 140 illuminates the light array 130 based on the one or more assembly identification parameters and/or data associated with the determined assembly shall be explained later in the specification.

Figure 3A:
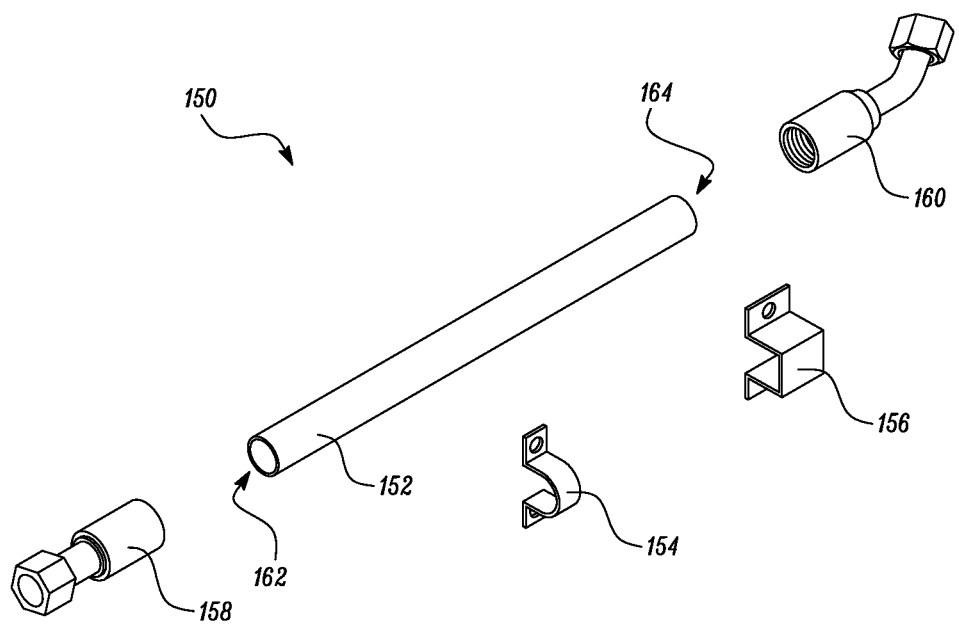
FIG. 3A illustrates a plurality of components, in accordance with an embodiment of the present disclosure.

For the purpose of better understanding of the current disclosure, let us assume that the assembling system 100 (shown in FIG. 1) is for forming an assembly 150 of a plurality of components, as shown in FIG. 3. The assembly 150 may include a first component 152, a second component 154, a third component 156, a fourth component 158 and a fifth component 160. In the exemplary embodiment illustrated, the assembly 150 is a hose assembly. The hose assembly includes a hose (first component 152), a first add-on component (second component 154), a second add-on component (third component 156), a first hose coupling member (fourth component 158) and a second hose coupling member (fifth component 160).

In the exemplary embodiment illustrated, the second component 154 and the third component 156 may be functional components configured to be disposed at specific locations on the first component to achieve a desired effect. In the embodiment illustrated, the second component 154 and the third component 156 are circular clip and a square clip, respectively, configured to facilitate coupling of the assembly 150 to a desired component/machine. In an alternate embodiment, the second component 154 and the third component 156 may be a strengthening device to be disposed on the first component 152. The strengthening device may be configured to enhance the tensile strength, the shear strength and the pressure withstanding capacity of the first component 152. In another example, the second component 154 and the third component 156 may be a protective member configured to shield at least a portion of the first component 152 from abrasive particles and external damage. In various other embodiments, the second component 154 and the third component 156 may be any add-on known in the art.

In the embodiment illustrated, the fourth component 158 and fifth component 160 are connecting devices to be respectively positioned at opposite ends of the first component 152 to connect or couple the first component 152 with another component such as with a tap or an appliance. In the embodiment illustrated, the fourth component 158 is a straight coupling member whereas the fifth component 160 is an angular coupling member.

While the exemplary assembly 150 disclosed above includes five components (the hose, the first add-on component, the second add-on component, the first hose coupling member and the second hose coupling member), it may be contemplated that in various other embodiments the assembly 150 may include fewer or more than five components. Further, while the exemplary assembly 150 relates to a hose assembly, in various other embodiments the assembly 150 to be formed by the assembling system 100 may be other types of assemblies such as clutch assemblies, engine assemblies, work implement assemblies and the like.

INDUSTRIAL APPLICABILITY

The working of the assembling system 100 shall now be explained with the help of exemplary scenarios and illustrations presented in FIG. 1-FIG. 7. Referring to FIG. 1, the assembly jig 110 and the light array 130 in an inactive state are shown. Let us consider an exemplary scenario where the operator provides an input using the input device 144, as shown in FIG. 2. More specifically, the operator inputs one or more assembly identification parameters using the input device 144. As discussed above, the one or more assembly identification parameters correspond to one or more identifiers (such as code number, model number, part specific number, assembly number, etc.) for determining a specific assembly to be formed. Let us consider an exemplary scenario where the operator has input one or more assembly identification corresponding to the assembly 150. The controller 140 receives the one or more assembly identification parameters and runs a set of instructions stored in the memory 142 on the one or more assembly identification parameters to identify and determine that the assembly 150 (as illustrated in FIG. 3) is desired to be formed.

The controller 140 now extracts data associated with the assembly 150 from the database 146. The data associated with the assembly 150 may include the one or more dimensional parameters for the assembly 150, one or more coupling parameters for the assembly 150, and one or more tolerances associated with the assembly 150. The one or more dimensional parameters for the assembly 150 may include desired lengths of the first component 152, second component 154, third component 156, fourth component 158 and fifth component 160. In the exemplary scenario, the one or more dimensional parameters associated with the assembly 150 may include information such as first component 152 has a length of 130 centimeters, the second component 154 has a length of 15 centimeters, the third component 156 has a length of 25 centimeters, the fourth component 158 has a length of 20 centimeters and the fifth component 160 has a length of 50 centimeters. Such information may be pre-stored within the database 146.

The one or more coupling parameters for the assembly 150 may include a relative location of one component relative to another component, the base component (i.e. main component over which one or more components are to be placed/positioned), number of components to be mounted/coupled/positioned on the base component, order of assembly, total length of the assembly 150, overlap of one component over the other, etc. For example, in the assembly 150, the first component 152 is the base component and the fourth component 158 may be positioned at a left end 162 of the first component 152, as illustrated in FIG. 3. This information may be stored in the database 146 as the one or more coupling parameters associated with the assembly 150.

In an embodiment, the one or more coupling parameters for the assembly 150 may further include the information that the fifth component 160 is to be positioned at a right end 164 of the first component 152. Further, in another embodiment, the one or more coupling parameters for the assembly 150 may include the information that the second component 154 is to be disposed on the first component 152 at a distance of 30 centimeters from the left end 162 of the first component 152 and that the third component 156 is to be positioned on the first component 152 at a distance of 100 centimeters from the left end 162 of the first component 152. Such coupling information may be pre-stored within the database 146.

The one or more tolerances associated with the assembly 150 may include a limit of permissible deviation in physical parameters associated with the assembly 150 and the plurality of components used therein. For example, as mentioned above, the first component 152 may have length of 130 centimeters. However, external factors such as temperature may cause the first component 152 of length 130 centimeters to expand or contract. In the exemplary scenario, the one or more tolerances associated with the first component 152 may include information that the first component 152 has a tolerance of ±5 centimeters to account for such unavoidable deviations. Such information may be pre-stored within the database 146. In a similar manner, tolerances for other such components used in the assembly 150 may be pre-stored within the database 146.

After the controller 140 extracts the data associated with the assembly 150 (such as the one or more dimensional parameters for the assembly 150, one or more coupling parameters for the assembly 150, and one or more tolerances associated with the assembly 150), the controller 140 determines a color pattern to be generated by the light array 130 in the assembly jig 110 i.e. on the first surface 122 and the second surface 124. The controller 140 determines the color pattern based on the extracted data associated with the assembly 150. The color pattern may be generated on the assembly jig 110 for at least a partial length of the assembly jig 110.

Figure 3B:
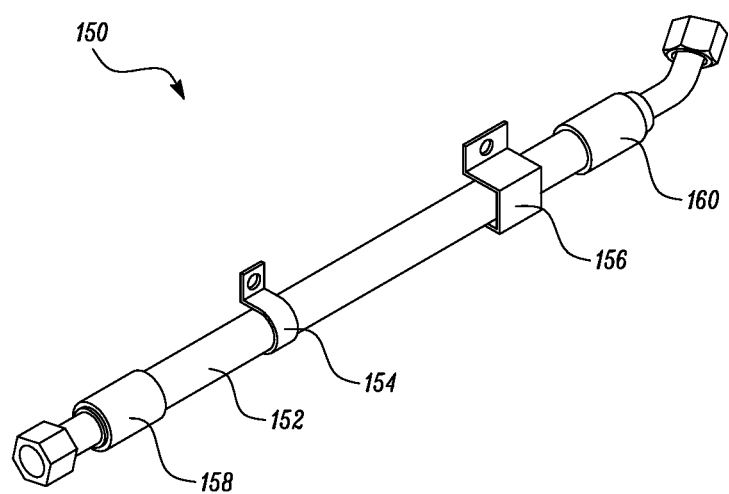
FIG. 3B illustrates an assembly of the plurality of components, in accordance with an embodiment of the present disclosure.

The generation of the color pattern along the assembly jig 110 shall now be explained in detail. As mentioned above, the controller 140 extracts/receives the information that the length of the first component 152 is desired to be 130 centimeters. The controller 140 may also possess the information that the fourth component 158 having a length of 20 centimeters is to be positioned and coupled to the left end 162 of the first component 152 (as shown in FIG. 3B). The controller 140 may further extract data that the fifth component 160 having a length of 50 centimeters is to be positioned and coupled to the right end 164 of the first component 152. The controller 140 may additionally extract/receive data from the database 146 that the second component 154 having length of 15 centimeters and third component 156 having length of 25 centimeters are to be disposed over the first component 152.

The controller 140 now determines the total length (i.e. 130 (second component 154)+20 (fourth component 158)+ 50 (fifth component 160)=200 centimeters) of the assembly 150. In the exemplary scenario, the lengths of the second component 154 and the third component 156 have not been accounted for in the total length computations for the assembly 150 as these components are to be disposed on the first component 152 and doing so would not affect the overall/total length of the assembly 150. However, in some embodiments, the lengths of the second component 154 and the third component 156 may be accounted for in the computation of the total length of the assembly 150 as they may impact the overall length of the assembly 150.

After determining the total length of the assembly 150, the controller 140 may determine an area 200 having a length equal to the total length of the assembly 150 in the assembly jig 110, as shown in FIG. 4. For the purpose of understanding of the current disclosure, let us assume that the assembly jig 110 has the length 'L' equal to 300 centimeters. The controller 140 determines the area 200 having a length of 2 meters (i.e. $2\times10^2$ centimeters) on the assembly jig 110 proximal to the first end 112. The area 200 initiates from a portion proximal to the first end 112 and extends towards the second end 114 for at least a partial length of the assembly jig 110, as shown in FIG. 4.

The controller 140 now divides the area 200 (having length of 200 centimeters) into three areas i.e. area 210 having length of 20 centimeters, area 220 having length of 130 centimeters and area 230 having length of 50 centimeters for the fourth component 158, first component 152 and fifth component 160, respectively. The controller 140 then illuminates the first surface 122 and the second surface 124 in the assembly jig 110 by powering/controlling a portion of the light array 130 such that the area 210, 220 and 230 are illuminated. In an embodiment, the area 220 having length of 130 may be illuminated by a first color (for example, a white color). The area 210 may be illuminated by a second color for example, an orange color. The area 230 may be illuminated by a third color for example, a magenta color.

The controller 140 may furthermore receive the information that the second component 154 is to be positioned on the first component 152 at a distance of 30 centimeters from the left end 162 of the first component 152 and that the third component 156 is to be positioned on the first component 152 at a distance of 100 centimeters from the left end 162 of the first component 152, as shown in FIG. 3B. The controller 140 may accordingly, illuminate portions of the light array 130 such that areas 240 and 250 are illuminated, as shown in FIG. 4. The area 240 and 250 lie within the area 220 such that the area 240 is at a distance of 30 centimeters from a first end 222 of the area 220 and the area 250 may be at a distance of 100 centimeters from the first end 222 of the area 220. In an embodiment, the area 240 and 250 may be illuminated by a fourth color and a fifth color for example, a blue color and a yellow color, respectively.

Similarly, the controller 140 has the information about the one or more tolerances associated with the assembly 150. The controller 140 may illuminate the light array 130 and produce a desired visual indication on the assembly jig 110 (i.e. on the first surface 122 and the second surface 124) to indicate the tolerances associated with the assembly 150. For example, as mentioned above, the first component 152 may have a tolerance of ±5 centimeters and the controller 140 may control the light array 130 such that the light array 130 illuminates the area 220 via the white color. In addition to this, the controller 140 may illuminate a colored area 260 to provide a visual indication for the one or more tolerances associated with the assembly 150. For example, lines 190 may be formed in the assembly jig 110. One line 190 may lie within the area 220 at a distance of 5 centimeters from the first end 222 of the area 220, as shown in FIG. 4. Another line 190 may lie within the area 210 at a distance of 5 centimeters from the first end 222 of the area 220. The area 260 between the lines 190 may be filled by a sixth color for example a red color to visually depict the one or more tolerance associated with the first component 152 in the assembly jig 110. In a similar manner other such tolerances may be generated via lines or other colored areas for the other components of the plurality of components.

Thus, the controller 140 controls the light array 130 such that the color pattern (i.e. the colored areas 210, 220, 230, 240 and 250) is generated on the assembly jig 110, as shown in FIG. 4. Subsequent to generation of the color pattern, the operator starts positioning the components on/within the assembly jig 110. In an embodiment, the operator may have knowledge about which component is to be placed over a specific colored area. In an embodiment, the operator may be configured to place components as per pre-defined instructions on a color chart. The color chart may be displayed on the display of the input device 144. In an embodiment, the color chart may be present on the assembly jig 110.

Figure 5A:
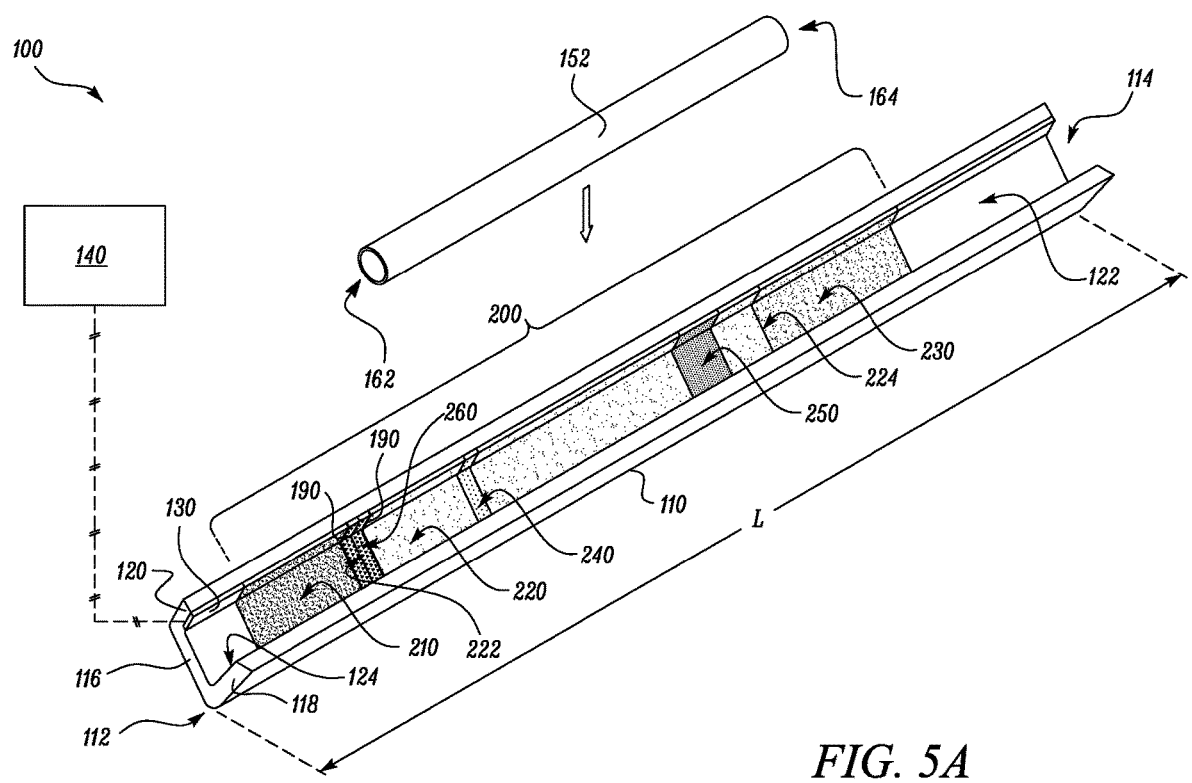
FIG. 5A illustrates a first component of the plurality of components being positioned in an assembly jig based on an illumination of a light array, in accordance with an embodiment of the present disclosure.
Figure 5B:
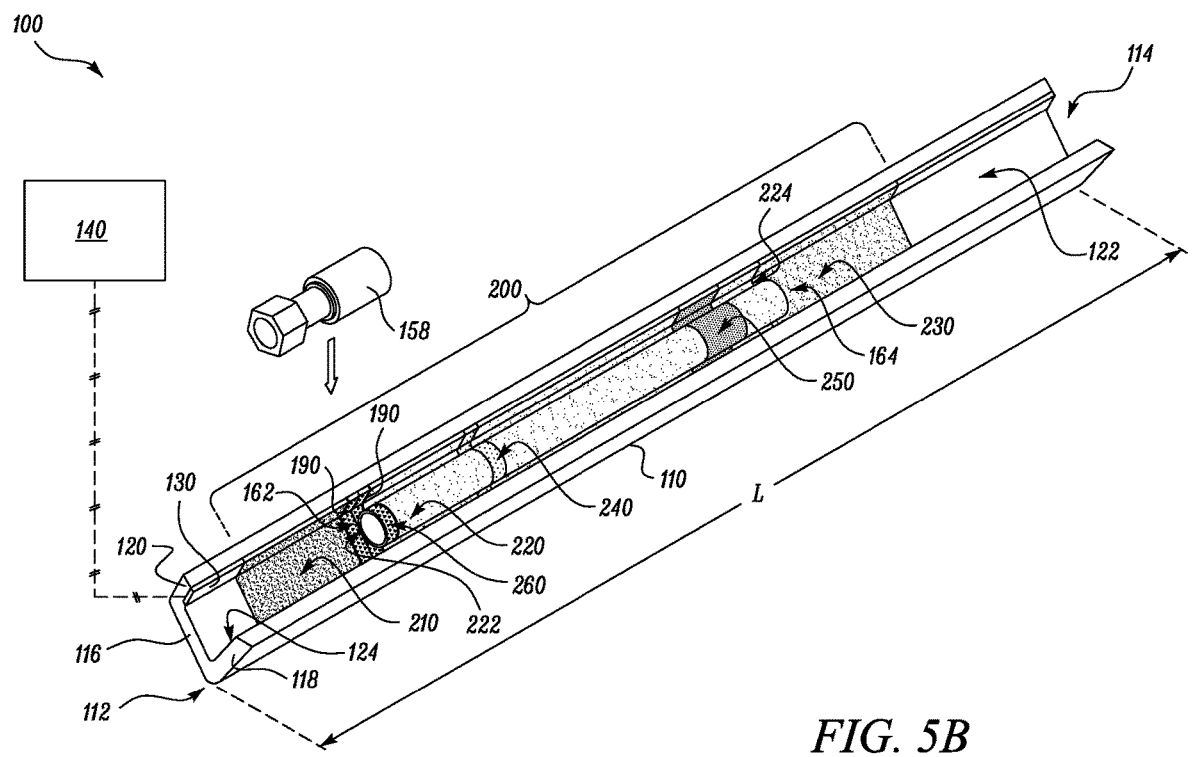
FIG. 5B illustrates a fourth component of the plurality of components being positioned in the assembly jig based on the illumination of the light array, in accordance with an embodiment of the present disclosure.

In an example, the color chart may suggest to the operator that firstly the first component 152 is to be placed on the area 220 having the white color, as shown in FIG. 5A. After the first component 152 is placed within the assembly jig 110, a portion of the color pattern (i.e. the colored areas 220, 240, 250 and 260) gets superimposed on the on the first component 152, as shown in FIG. 5B. Further, adjacent the left end 162 and the right end 164 of the first component 152 lie the areas 210 and 230, respectively.

Figure 5C:
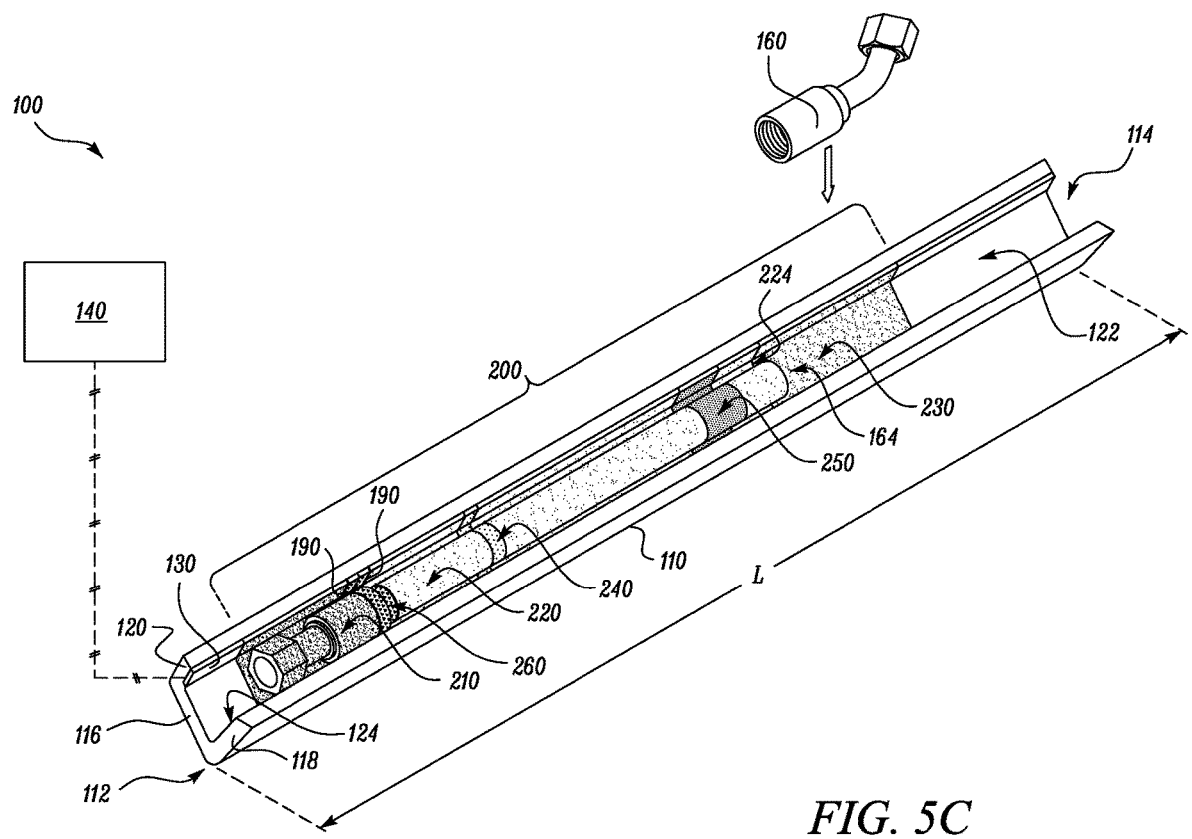
FIG. 5C illustrates a fifth component of the plurality of components being positioned in the assembly jig based on the illumination of the light array, in accordance with an embodiment of the present disclosure.
Figure 5D:
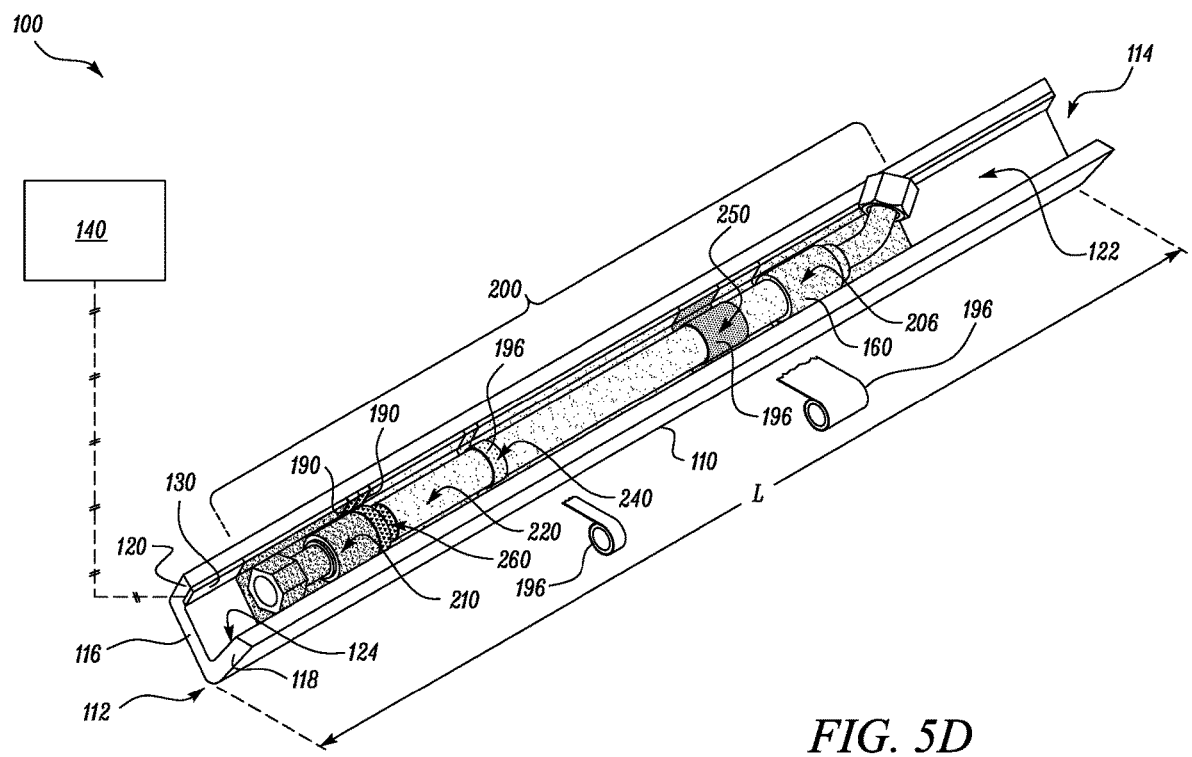
FIG. 5D illustrates marking tapes being positioned in the assembly jig based on the illumination of the light array, in accordance with an embodiment of the present disclosure.

The color chart may further suggest that the fourth component 158 shall now be placed on the area 210 illuminated by the orange color, as shown in FIG. 5B. Similarly, the color chart may further suggest that the fifth component 160 is to be placed on the area 230 illuminated by the magenta color, as shown in FIG. 5C. Furthermore, the color chart may suggest that marking tapes 196 of the same or different color are to be provided on the area 240 and 250 illuminated by the blue and yellow color respectively, as shown in FIG. 5D. Over the marking tapes 196, the second component 154 and the third component 156 are positioned, as shown in FIG. 6.

Figure 6:
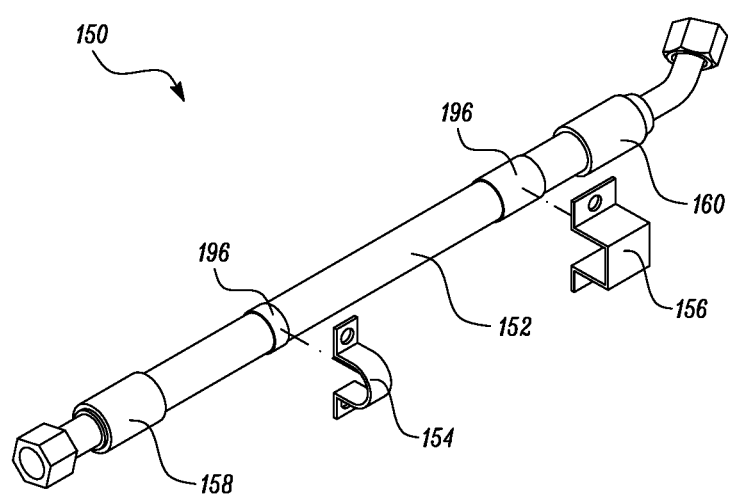
FIG. 6 illustrates providing one or more components on marking tapes, in accordance with an embodiment of the present disclosure.
Figure 7:
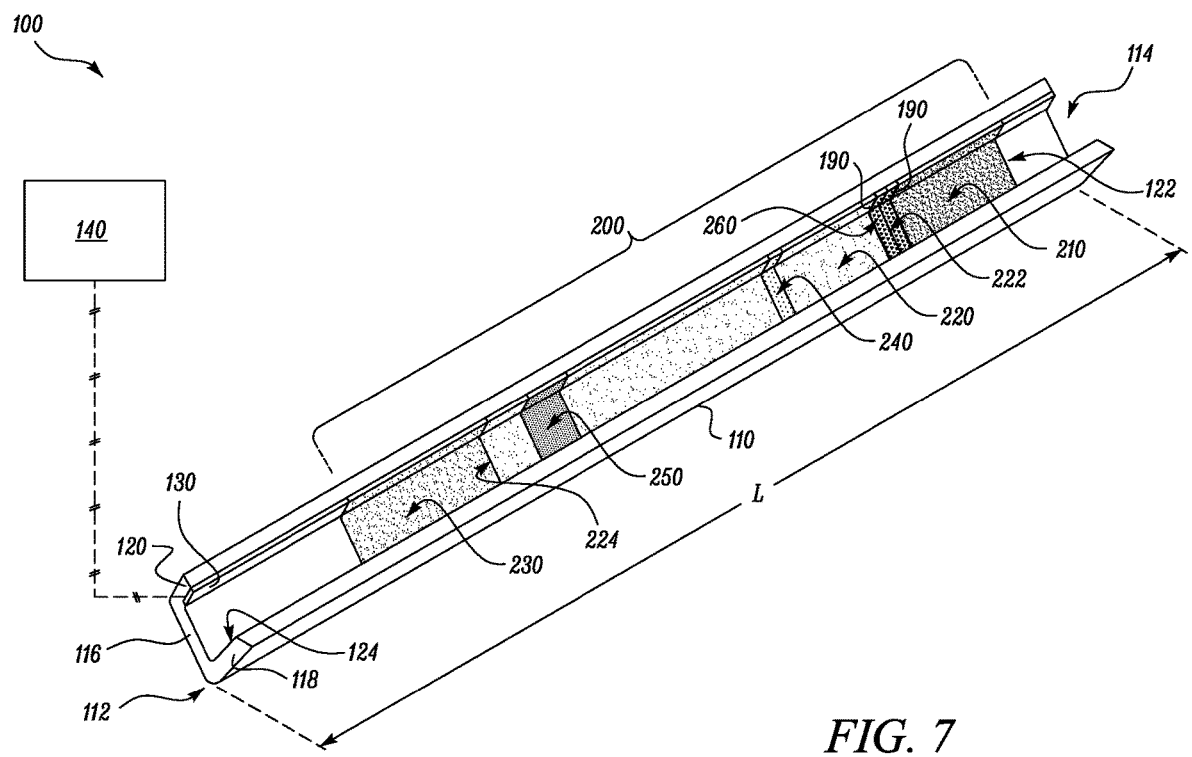
FIG. 7 illustrates the assembly jig and the light array after the controller modifies color pattern generated in FIG. 4, in accordance with an embodiment of the present disclosure.
Figure 8:
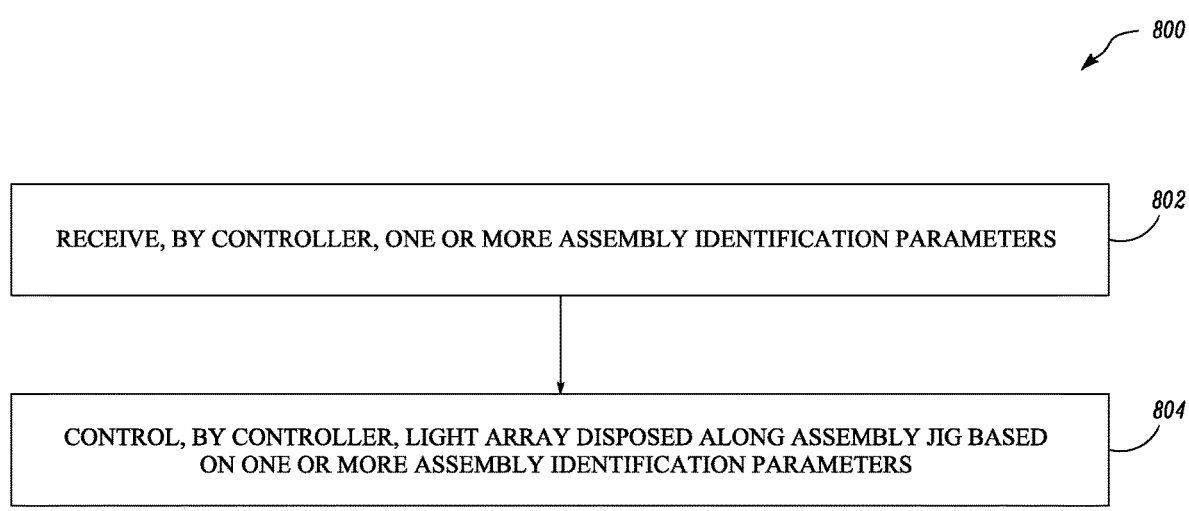
FIG. 8 illustrates a method for forming the assembly of the plurality of components, in accordance with an embodiment of the present disclosure.

In the embodiment illustrated in FIG. 4-FIG. 6, the controller 140 controls the light array 130 such that the color pattern generated on the assembly jig 110 initiates from a portion on the assembly jig 110 proximal to the first end 112. In an embodiment, the controller 140 may be configured to modify the color pattern generated by the light array 130 such that the modified color pattern initiates from a portion on the assembly jig 110 proximal to the second end 114 and extends towards the first end 112 for atleast a partial length of the assembly jig 110, as shown in FIG. 6. Such capability of the light array 130 allows the operator to locate the locations for one or more component of the assembly 150 from both ends (112 and 114) of the assembly jig 110.

In the embodiments disclosed and illustrated, the light array 130 generates colored areas on the assembly jig 110. However, in an alternate embodiment, the areas 210, 220, 230, 240, 250 and 260 may be of the same color but may have different brightness intensity, saturation and hue. For example, in an embodiment, the areas 210 and 220 may both be of white color. While area 210 may have a brightness of 'x', the area 220 may have a brightness of 'y' (where 'x' is not equal to 'y'). Such differences in intensity may distinguish the two areas from each other. In a similar manner, in various other embodiments, the areas 210, 220, 230, 240, 250 and 260 may have the same color but may have different saturation and hue to distinguish each area from the other.

Referring to FIG. 5-FIG. 8, a method 800 for forming the assembly 150 of the plurality of components 152, 154, 156, 158 and 160 is disclosed, in accordance with an embodiment of the present disclosure. The method 800 includes receiving, by the controller 140, one or more assembly identification parameters (Step 802). As discussed above, the controller 140 receives one or more assembly identification parameters from the input device 144. The controller 140 then extracts pre-stored data associated with the assembly 150 from the database 146. The controller 140 then determines the one or more locations and/or areas 210, 220, 230, 240, 250 and 260 on the assembly jig 110 to be illuminated where the one or more locations and/or areas 210, 220, 230, 240, 250 and 260 are based on the data associated with the assembly 150.

The method 800 further includes controlling, by the controller 140, the light array 130 disposed along the assembly jig 110 based on the one or more assembly identification parameters (Step 804). The step 804 of controlling the light array 130 based on the one or more assembly identification parameters includes powering the light array 130 to illuminate the determined one or more locations and/or areas 210, 220, 230, 240, 250 and 260 in the assembly jig 110. In an embodiment, the controller 140 includes powering the light array 130 in such a manner that each location and/or area 210, 220, 230, 240, 250 and 260 is illuminated using a distinct color. The color of each location and/or area 210, 220, 230, 240, 250 and 260 may be based on the data associated with the assembly 150 and the color chart.

The method 800 thus provides a visual indication to the operator for forming the assembly 150. More particularly, the method 800 provides a visual indication to the operator via the colored areas 210, 220, 230, 240, 250 and 260 to position and couple the plurality of components with each other according to a pre-defined design. This obviates the need for the operator to measure distances from an end of the assembly jig 110 to assemble the components of the assembly 150.

The time saved by the operator can be utilized to perform other task thereby enhancing overall productivity. Furthermore, method 800 and the assembling system 100 obviates the need for different kinds of jigs to be used for forming different kinds of assemblies as the light array 130 and the assembly jig 110 can be used to form any assembly as desired. Moreover, since the method 800 and the assembling system 100 also indicate the tolerances and lengths associated with the assembly 150, a need for measuring devices/inspection gauges is prevented. Thereby, reducing overall cost.

While aspects of the present disclosure have seen particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for forming an assembly of a plurality of components, the method comprising:
 receiving, by a controller, one or more assembly identification parameters;
 determining, by the controller, a color pattern to be generated along an assembly jig based on the one or more assembly identification parameters;
 controlling, by the controller, a light array disposed along the assembly jig to generate the color pattern along at least a partial length of the assembly jig by selectively powering the light array;
 locating each component of the plurality of components on the assembly jig based on the color pattern generated along the assembly jig; and
 assembling the plurality of components according to the location of each component on the assembly jig.

2. The method as claimed in claim 1, further comprising:
 receiving, by the controller, the one or more assembly identification parameters from an input device; and
 extracting, by the controller, data associated with the assembly, from a database, based on the one or more assembly identification parameters.

3. The method as claimed in claim 2, further including comprising:
 determining, by the controller, one or more locations, areas and surfaces on the assembly jig to be illuminated, the one or more locations, areas and surfaces being based on the data associated with the assembly; and
 controlling, by the controller, the light array to illuminate the one or more locations, areas and surfaces on the assembly jig.

4. The method as claimed in claim 3, further comprising:
 determining, by the controller, a color to be generated on each of the one or more locations, areas and surfaces on the assembly jig.

5. The method as claimed in claim 2, wherein the data associated with the assembly include one or more dimensional parameters associated with the assembly, one or more tolerances associated with the assembly and one or more coupling parameters associated with the assembly.

6. The method as claimed in claim 1, wherein the assembly jig includes a first end and a second end defining a length therebetween, and the light array extends from the first end to the second end.

7. The method as claimed in claim 1, wherein the light array includes one or more LED tapes arranged at an offset with each other, each LED tape including a plurality of LEDs spaced apart from each other.

8. The method as claimed in claim 1, wherein the color pattern includes a plurality of colors, and
 each component is located on the assembly jig to effect a superposition of each component with a unique color of the plurality of colors.

9. An assembling system for forming an assembly of plurality of components, the assembling system including:
 an assembly jig;
 a light array disposed along the assembly jig; and
 a controller communicably coupled to the light array, the controller being configured to:
  receive one or more assembly identification parameters;
  control the light array disposed along the assembly jig based on the one or more assembly identification parameters;
  determine a color pattern to be generated along the assembly jig based on the one or more assembly identification parameters; and
  control the light array to generate the color pattern along the assembly jig.

10. The assembling system as claimed in claim 9, further comprising:
 an input device communicably coupled to the controller and configured to receive the one or more assembly identification parameters; and
 a database communicably coupled to the controller and configured to store data associated with the assembly.

11. The assembling system as claimed in claim 9, wherein the light array includes one or more LED tapes stacked at an offset to each other, each LED tape including a plurality of LEDs spaced apart from each other.

12. The assembling system as claimed in claim 9, wherein the assembly jig includes a first end and a second end, and the light array extends between the first end and the second end; and the controller is further configured to control the light array to generate the color pattern along the assembly jig such that the color pattern initiates from the first end and extends toward the second end for at least a partial length of the assembly jig.

13. The assembling system as claimed in claim 12, wherein the controller is further configured to modify the color pattern generated by the light array such that the color pattern initiates from the second end and extends toward the first end for at least a partial length of the assembly jig.

\* \* \* \* \*